United States Patent [19]

Wakeman

[11] Patent Number: 5,228,422
[45] Date of Patent: Jul. 20, 1993

[54] INTERNAL COMBUSTION ENGINE AND A METHOD OF OPERATING SAME

[75] Inventor: Anthony C. Wakeman, West Midlands, England

[73] Assignee: Lucas Industries Public Limited Company, Solihull West Midlands, England

[21] Appl. No.: 718,386

[22] Filed: Jun. 20, 1991

[30] Foreign Application Priority Data

Dec. 14, 1990 [GB] United Kingdom ............... 9027124

[51] Int. Cl.⁵ ............................................. F02B 15/00
[52] U.S. Cl. .................................... 123/432; 123/308; 123/316
[58] Field of Search .................... 123/316, 432, 308

[56] References Cited

U.S. PATENT DOCUMENTS

| | | | |
|---|---|---|---|
| 4,488,531 | 12/1984 | Tadokoro | 123/432 |
| 4,523,560 | 6/1985 | Motosugi | 123/308 |
| 4,552,112 | 11/1985 | Nagao | 123/308 |
| 4,703,734 | 11/1987 | Aoyama | 123/432 |
| 4,892,067 | 1/1990 | Paul | 123/90.12 |
| 4,938,191 | 7/1990 | Oldani | 123/432 |
| 4,951,617 | 8/1990 | Linamen | 123/52 MF |

*Primary Examiner*—Willis R. Wolfe
*Assistant Examiner*—Erick Solis
*Attorney, Agent, or Firm*—Nixon & Vanderhye

[57] ABSTRACT

The invention relates to an internal combustion engine comprising an inlet manifold, at least one combustion chamber with at least two inlet valves and at least one outlet valve, a piston reciprocable in the or each chamber to define a variable volume space therein, and means for controlling the timing of the opening and closing of each of two of the inlet valves of the or each chamber independently so that opening of one of the independently controlled inlet valves of the or each chamber occurs during the exhaust stroke of the engine, opening of the other of the independently controlled inlet valves of the or each chamber, at a time when said one of the independently controlled inlet valves is closed, and when pressure in the or each chamber is lower than pressure in said inlet manifold, producing a predetermined pressure differential across said other of the independently controlled inlet valves, creating an in-flow to the or each chamber generating turbulence, at least some of which is present when combustion occurs in the or each chamber. Preferably for light load said one inlet valve closes during the induction stroke and the other inlet valve opens and closes during the compression stroke. For full load said one inlet valve closes during the compression stroke, whilst the other inlet valve opens and closes during the induction stroke, so that both inlet valves are open together during induction.

21 Claims, 2 Drawing Sheets

INTERNAL COMBUSTION ENGINE AND A METHOD OF OPERATING SAME

BACKGROUND OF THE INVENTION

1. Field of the Invention

This invention related to internal combustion engines and their operation, and in particular to a development of the invention disclosed in our co-pending U.K. Patent application no. 9016813.9.

2. Discussion of Prior Art

In said co-pending application, timing of the opening and closing of an inlet valve of a combustion chamber is controlled so that its opening creates an in-flow to the chamber to create turbulence, which thereafter assists combustion. Preferably between ignitions in the engine's cycle there are two openings of a single inlet valve, two separate inlet valves opening once each or separate openings of an exhaust valve and an inlet valve.

However, with engines having two inlet valves per cylinder, and a separate camshaft for each such valve, there is a difficult compromise between the rate of valve opening defined by the cam profile, the intensity of turbulence and pumping work.

In an ideal case, the first and second inlet valve openings would, at light load, be of short duration. The first valve would open near to TDC and its closing would not be too late in the induction stroke otherwise the pressure differential developed across the second inlet valve by the time of its opening would be inadequate to produce the desired 'blowdown' turbulence. The second valve closing time is fixed by the requirement to trap the desired mass of mixture in the cylinder, and the opening of the second valve should be as late as possible so that the blowdown turbulence has only a short time to decay. At 6000 RPM, the stress on the nose of the cam and cam follower controlling the inlet valves is high with conventional opening periods. To operate with periods of approximately half these values for the double induction process would force either a much lower RPM limit or a much reduced valve lift. Both of these actions would reduce maximum power available to meet full load demand.

An object of the invention is to overcome this difficulty.

According to the invention there is provided a method of operating an internal combustion engine having an inlet manifold, at least one combustion chamber with at least two inlet valves and at least one outlet valve, a piston reciprocable in the or each chamber to define a variable volume space therein, and means for controlling the timing of the opening and closing of each of two of the inlet valves of the or each chamber independently, the method comprising opening one of the independently controlled inlet valves of the or each chamber during the exhaust stroke of the engine, producing first and second pressures in the inlet manifold and the at least one chamber respectively, said first pressure being greater than said second pressure, whereby opening of the other of the independently controlled inlet valves of the or each chamber, at a time when said one of the independently controlled inlet valves is closed and while this predetermined pressure differential exists, creates an in-flow into the or each chamber generating turbulence, at least some of which is present when combustion occurs in the or each chamber.

According to another aspect of the invention there is provided an internal combustion engine comprising an inlet manifold, at least one combustion chamber with at least two inlet valves and at least one outlet valve, a piston reciprocable in the or each chamber to define a variable volume space therein, and means for controlling the timing of the opening and closing of each of two of the inlet valves of the or each chamber independently so that opening of one of the independently controlled inlet valves of the or each chamber occurs during the exhaust stroke of the engine, opening of the other of the independently controlled inlet valves of the or each chamber, at a time when said one of the independently controlled inlet valves is closed, and when pressure in the or each chamber is lower than pressure in said inlet manifold, producing a predetermined pressure differential across said other of the independently controlled inlet valves, creating an in-flow to the or each chamber generating turbulence, at least some of which is present when combustion occurs in the or each chamber.

The expressions 'induction stroke', 'compression stroke' and 'exhaust stroke' as used herein are intended to have their usual meanings in relation to a piston of a four stroke engine, notwithstanding the opening and closing of inlet and exhaust valves at timings different from the normal relative to said strokes.

BRIEF DESCRIPTION OF THE DRAWINGS

The invention will now be described, by way of example, with reference to the accompanying drawings, in which.

DETAILED DISCUSSION OF PREFERRED EMBODIMENTS

In our co-pending U.K. Patent application no. 9016813.9 it is described and illustrated how 'blowdown' turbulence can be produced by opening a single inlet valve of a combustion cylinder twice. It is also mentioned that the invention is clearly applicable to an engine with two inlet valves (and at least one exhaust valve) per cylinder. However with two inlet valves it is, as explained, a difficult compromise between the rate of valve opening defined by the cam profile of the valve camshaft, the intensity of turbulence, and pumping work, with the opening and closing timing referred to. If the longer than ideal open periods are accepted, then the timing of the first valve's closing must remain unchanged to maintain the pressure differential. Thus the opening of the first valve must occur during the exhaust stroke.

Figure 1:
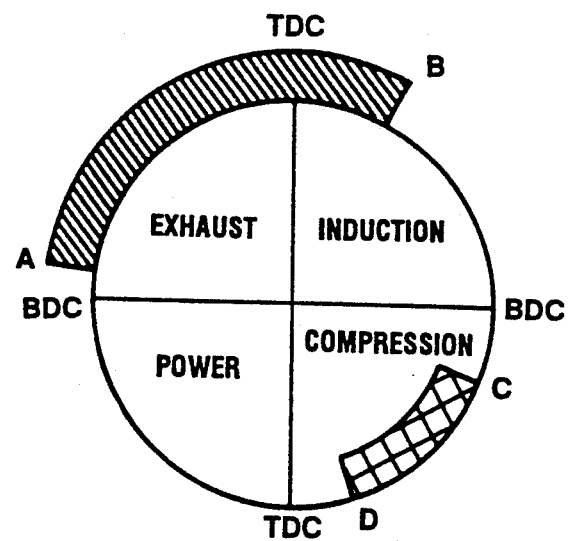
FIG. 1 is a diagram showing the timing of the opening and closing of two inlet valves of a cylinder of an internal combustion engine of the invention, relative to the engine's four strokes, the engine being subject to light load.

Accordingly, as shown in FIG. 1 where the engine is subject to a light load, one of the inlet valves, hereinafter called the 'first' inlet valve, opens at A, which is only shortly after the start of the exhaust stroke. To prevent backflow of exhaust gases into the inlet manifold a reed valve or other non-return valve is disposed upstream of said first inlet valve, e.g. in said first inlet valve's feed duct.

The opening of this first inlet valve is longer than envisaged in our aforementioned patent application and its timing is variable. During the early part of the induction stroke air/fuel mixture is drawn into the cylinder and then the first inlet valve closes, as indicated at B, before the induction stroke is complete.

The other inlet valve, hereinafter called the 'second' inlet valve, does not open until some time after the start of the compression stroke, indicated at C, and as the second inlet valve opens there is a rapid 'blowdown', which causes turbulence, in the same manner as described in our earlier patent application. Excess air/fuel mixture is induced into the cylinder, and as the piston rises the surplus is driven back out into the inlet manifold. The second inlet valve closes just before the end of the compression stroke, the timing of this closing determining the mass of trapped mixture. The pumping work and 'blowdown' turbulence are controlled by the timing of the closure of the first inlet valve. Each inlet valve is controlled by a separate cam shaft. Both inlet valves are open for at least 120° (crankshaft rotation) which is similar to current valve opening rates with metal valves. Possible future use of ceramic valves, which have a much lower mass, could allow faster opening and closing for the same level of stress on the nose of the valve operating cam.

The increase in the number of engines with four valves per cylinder is largely due to the demand for ever greater power from a given engine capacity. Two inlet valves per cylinder are needed to give the greatest flow area and minimum pressure drop, so that the maximum quantity of mixture can be induced at high RPM. Therefore although, as described, double induction and blowdown turbulence are needed at part load, both inlet valves will need to be open for most if not all of the induction stroke to maintain maximum power. Extra turbulence is not needed at full load because the mixture will be fast burning, partly due to the air/fuel ratio being stoichiometrically rich and partly due to the high temperature and pressure of the mixture at the time of ignition.

Figure 2:
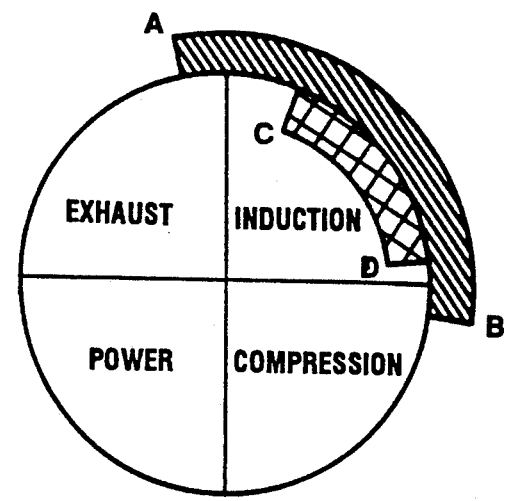
FIG. 2 is the same diagram, but with the engine subject to full load.

Although FIGS. 1 and 2 show the valve openings with light load and full load states respectively, the control of the engine is continuous with load. As load increases, the timing of the first inlet valve operation is retarded so that it closes progressively later in the induction stroke, and near to full load closure occurs after BDC. At the same time the second inlet valve closure is advanced to trap more mixture and at higher loads the inlet valve opening periods increasingly overlap. Accordingly blowdown turbulence progressively decreases with increase in load and falls to zero somewhere in the mid-load range.

For a full load situation, FIG. 2 shows how the first inlet valve now opens later. The opening A still occurs during the exhaust stroke, but now close to the end thereof. The first inlet valve stays open until just after the start of the compression stroke, position B, and is thus open throughout the induction stroke. The second inlet valve opens at C, someway into the induction stroke, and closes at D just before the end of the induction stroke. Thus both the inlet valves are open during the middle of the induction stroke when gas velocities are at their highest. No 'blowdown' turbulence occurs when the second inlet valve opens.

With the described arrangement there is no extra resistance to flow at full load, compared to a conventional two inlet valve engine. The compromise between 'blowdown' turbulence and pumping work is controlled by the timing of the first inlet valve closing.

In FIGS. 1 and 2 the period of opening of the second inlet valve is shown to be less than that of the first inlet valve. This has the advantage that at low RPM and light load blowdown turbulence occurs during the compression stroke so giving the shortest time for the turbulence to decay before ignition. However where the highest power output is required, i.e. to maximise torque at high RPM, the second inlet valve may need the same period of opening as the first inlet valve.

Figure 3:
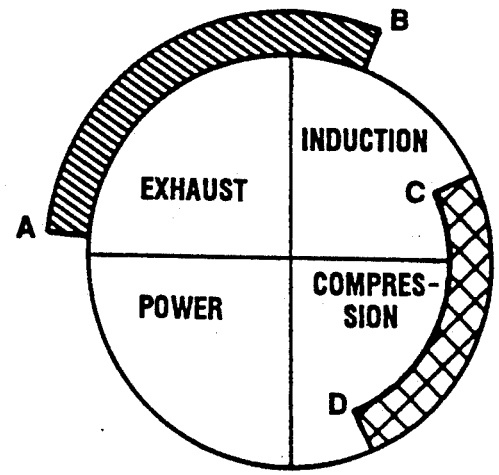
FIG. 3 is again the same diagram, with the engine subject to light load, the second inlet valve opening now being longer than shown in FIG. 1, and the first inlet closing being earlier.

If, in the case of light load, the second inlet valve were to open during the induction stroke, any problem due to increased decay in the blowdown turbulence can be countered by closing the first inlet valve earlier to increase the pressure differential and the blowdown energy. The overall effect is thus to trade off some pumping work to gain the highest possible power output. FIG. 3 shows, for a light engine load, the consequences of increasing the duration of the opening of the second inlet valve towards the same duration as the opening of the first inlet valve. As described, the second inlet valve opening now occurs before the end of the induction stroke and the first inlet valve closes earlier, to increase the pressure differential and thus the blowdown energy.

For engines with 3 inlet valves per cylinder, it is considered best for two of the valves to be simultaneously opened during the exhaust stroke, with the third inlet valve making the second opening, in order to make the average flow rate at the third inlet valve during blowdown as high as possible.

As described, the timing of the inlet valves is controlled. Additionally the or each exhaust valve of the cylinder can have its timing controlled so that, for example, it does not close until after the start of the induction stroke, whereupon exhaust gas is induced into the cylinder. When the second inlet valve opens, there would still be, as described above, induction of an air/fuel mixture to produce blowdown turbulence. However the chamber would already contain a mixture of exhaust gas, induced through the exhaust valve, and air, induced through the first inlet valve. The mixture induced through the exhaust valve and the first inlet valve can have its degree of dilution controlled, in order to reduce the formation of nitrous oxides, without risking misfire through excessive dilution, whilst at the same time allowing retention of control of the blowdown energy and corresponding pumping work.

The timing of the exhaust valve closure would determine the degree of dilution with exhaust gas, and the timing of the closure of the first inlet valve would determine the overall blowdown energy, assuming that the first inlet valve closes after the closure of the exhaust valve. Ideally the timing of the inlet valve opening would be retarded as the closure of the exhaust valve was retarded, to maintain a similar degree of overlap (if any). However this may only prove essential if the engine retains a throttle, so that the inlet manifold pressure is significantly below that of the exhaust manifold.

In another embodiment, almost the same effect occurs if the exhaust valve closes earlier, namely during the exhaust stroke. The earlier the closure, the more exhaust gas is trapped and these gases are then compressed and expanded as the piston rises to TDC and then descends again. The gases act as a spring and little energy is lost. The main advantage of early exhaust valve closure is that there is no possibility of the exhaust valve clashing with the piston near TDC.

The method and apparatus so far described have been concerned with an engine having a carburettor for producing the air/fuel mixture required for combustion. However the invention also has applicability to a fuel injected engine, being particularly advantageous in relation to cold starting and warm up, by improving mixture preparation.

With conventional port fuel injection, for example, the fuel spray is introduced when the inlet valve is closed. The fuel forms a liquid film on the back of the valve and the walls of the inlet port, this liquid film being substantially evaporated by the time that the inlet valve is opened. When the engine is cold, little of the fuel film is evaporated and the mixture drawn into the cylinder when the inlet valve opens has a reduced vapour concentration and much of the fuel is in droplet form. Extra fuel must thus be added during warm up to raise the concentration of both vapour and small diameter droplets to achieve an easily ignited mixture, but with the penalty of increased CO and HC emissions. This problem of slow evaporation of the fuel film on the manifold wall when the engine is cold, applies equally to carburettors and single point injectors.

A known proposed improvement is to use air assisted fuel injectors to generate a fuel spray of small diameter droplets which tend to remain in suspension in the air rather than forming a fuel film on the walls of the inlet port. Provided that the droplets are below a critical diameter of about 10 μm, the spark will ignite the cloud of droplets as easily as with a vaporised fuel mixture.

However, it is considered that the blowdown effect of the invention will produce a similar process of atomisation. If the second inlet valve opening is delayed until the descending piston has reduced the in-cylinder pressure to below that in the inlet manifold, opening of the inlet valve results in a sudden inrush of air, which will tend to atomise the fuel collected around the inlet valve seat. Whether changes are needed to the control strategy for operation during cold running will depend on the type of double induction being used. Port fuel injection offers the opportunity to time the injection between openings, or to direct the injection into one port only.

With two inlet valves and the exhaust valve closing at or before the end of the exhaust stroke, the pressure differential exists when the second inlet valve opens, and best atomisation will be achieved if, during cold running, all the fuel is injected into the second inlet port and none into the first inlet port. At light loads the blowdown turbulence should ensure good mixing of this fuel with the air induced through each valve, but at high loads, when there is no blowdown turbulence, there may be some charge stratification, especially at low engine speeds. However, this is not expected to be a serious problem.

For single point injection systems, it is also possible to improve mixture preparation for cold starting, by means of blowdown turbulence, but only for the double induction process in which exhaust gas is induced first and air (with fuel) is induced in the second stage.

Another application of the invention is to engines with catalytic converters, so as to shorten the time to catalyst 'light-off', namely the time to heat the catalyst to temperatures at which it is most efficient in the removal of HC, CO and NOx. Emission regulations in several countries demand that automobiles are tested over defined drive cycles starting from cold. Test results indicate that most of the measured HC emissions occur before the catalyst has reached its 'light-off' temperature.

The catalyst can be heated more rapidly by opening the exhaust valve earlier, in the power stroke. In this way less energy is converted into useful work because the expansion ratio is reduced and consequently the exhaust gases are hotter. To maintain engine speeds and torques, the amount of air/fuel mixture induced has to be correspondingly increased, and with double induction this means closing the second inlet valve earlier to trap more mixture. Therefore the rate of heating the catalyst is increased both by the higher exhaust gas temperature and the increased mass flow.

The earlier exhaust valve opening and corresponding earlier second inlet valve closing may be reduced either progressively with time or stepwise, having established experimentally how much time is needed to achieve 'light-off'. If a catalyst temperature signal is available then the timings can be restored to their warmed up values as the catalyst reaches a specified temperature.

Figure 4:
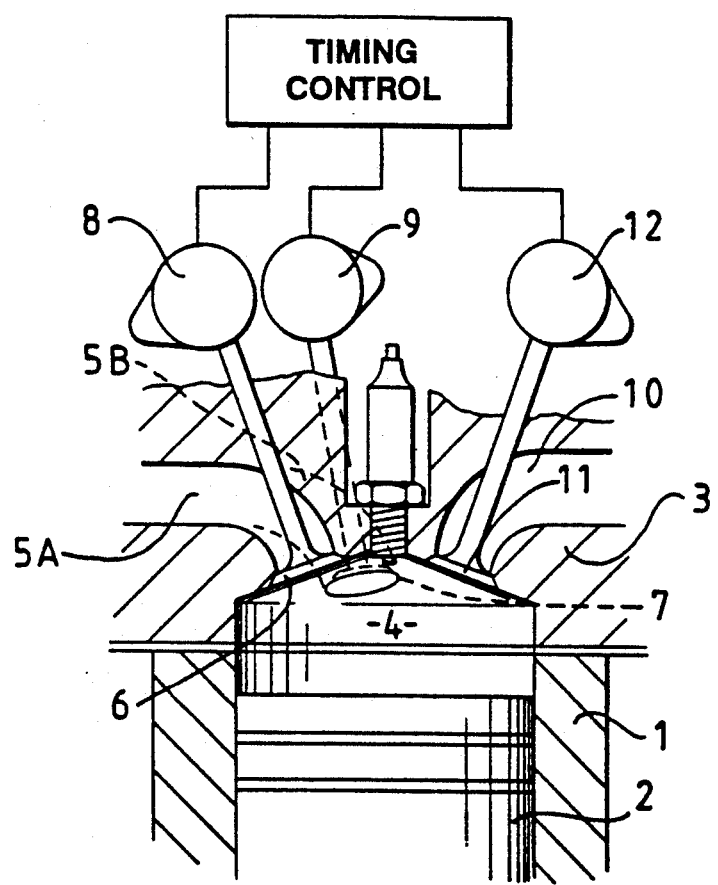
FIG. 4 is a sectional view of one embodiment of the present invention.

FIG. 4 illustrates part of an engine embodying the invention and including a cylinder 1 within which slides a piston 2, the cylinder being closed by a cylinder head 3 to define a combustion chamber 4 above the piston. The cylinder head contains inlet manifold branches 5A, 5B and gas flow from these into the combustion chamber is controlled by a pair of inlet valves 6, 7 controlled by respective cams 8, 9. Burnt gases from the cylinder 4 are ejected through an exhaust manifold 10 under the control of an exhaust valve 11 operated by a further cam 12. The timing of the operation of the cams and thereby the valves 6, 7, and 11 relative to each other is effected by conventional timing control means responsive to operational parameters of the engine.

I claim:

1. A method of operating an internal combustion engine having an inlet manifold, at least one combustion chamber with at least two inlet valves and at least one outlet valve, a piston reciprocable in said at least one chamber to define a variable volume space therein, and means for controlling the timing of the opening and closing of each of said at least two inlet valves of said at least one combustion chamber independently, the method, at partial load, comprising the steps of:
   opening one of the independently controlled inlet valves of said at least one chamber during the exhaust stroke of the engine;
   producing first and second pressures in the inlet manifold and said at least one chamber, respectively, said first pressure being greater than said second pressure; and
   opening the other of the independently controlled inlet valves of said at least one chamber, at a time when said one of the independently controlled inlet valves is closed and while a pressure differential exists between said first and second pressures creating an in-flow into said at least one chamber generating turbulence, at least some of which turbulence is present when combustion occurs in said at least one chamber.

2. A method as claimed in claim 1, wherein said method includes the step of closing said one of the independently controlled inlet valves during the induction stroke.

3. A method as claimed in claim 2, wherein said method includes the step of closing the other of the independently controlled inlet valves during the compression stroke.

4. A method as claimed in claim 2, wherein said second opening step includes opening the other of the independently controlled inlet valves during the compression stroke.

5. A method as claimed in claim 2, wherein said second opening step includes opening the other of the independently controlled inlet valves during the induction stroke.

6. A method as claimed in claim 5, wherein respective periods of opening of the two independently controlled inlet valves are equal.

7. A method as claimed in claim 1, wherein said at least one outlet valve closes after the start of the induction stroke and the other of the independently controlled inlet valves opens after closure of said at least one outlet valve.

8. A method as claimed in claim 1, in which said at least one outlet valve closes before the end of the exhaust stroke to trap exhaust gas, which is expanded as the piston moves through the induction stroke.

9. A method as claimed in claim 1, wherein with increasing load, timing of the operation of said one of the independently controlled inlet valves is retarded and timing of the operation of the other of the independently controlled inlet valves is advanced.

10. A method as claimed in claim 9, wherein the other of the independently controlled inlet valves is opened at a time before said one of said independently controlled inlet valves has closed, without any of said in-flow generating turbulence being created thereby.

11. A method as claimed in claim 10, wherein at full load said one of the independently controlled inlet valves closes during the compression stroke and the other of said independently controlled inlet valves opens and closes during the induction stroke.

12. A method as claimed in claim 1, in which fuel is injected for combustion in said at least one combustion chamber, said injection occurring prior to any opening of the other independently controlled inlet valve which creates said in-flow, which in-flow is of air so that the fuel is atomised by said induced air.

13. A method as claimed in claim 12, wherein the fuel is injected into a port of said other independently controlled inlet valve only, and after said other independently controlled inlet valve has closed on its previous cycle and before it opens on its current cycle.

14. An internal combustion engine comprising:
an inlet manifold,
at least one combustion chamber with at least two inlet valves and at least one outlet valve,
a piston reciprocable in said at least one combustion chamber for defining a variable volume space therein, and
means for controlling the timing of the opening and closing of each of said two inlet valves of said at least one chamber independently so that opening of one of the independently controlled inlet valves of said at least one chamber occurs during the exhaust stroke of the engine, said controlling means opening the other of the independently controlled inlet valves of said at least one chamber, at a time when said one of the independently controlled inlet valves is closed, and when pressure in said at least one chamber is lower than pressure in said inlet manifold, and said controlling means producing a predetermined pressure differential across said other of said independently controlled inlet valves, thereby creating an in-flow to said at least one chamber generating turbulence, at least some of said turbulence is present when combustion occurs in said at least one chamber.

15. An engine as claimed in claim 14, wherein a non-return valve is disposed upstream of said one of the independently controlled inlet valves to prevent back-flow of exhaust gases into the inlet manifold when said one inlet valve is open during the exhaust stroke.

16. An engine as claimed in claim 15, wherein the non-return valve is a reed valve.

17. An engine as claimed in claim 14, including means for controlling the timing of the opening and closing of said at least one outlet valve.

18. An engine as claimed in claim 14, including fuel injection means for injecting fuel for combustion in said at least one combustion chamber, said combustion at least at low load including air induced at said in-flow when said other one of the independently controlled inlet valves opens.

19. An engine as claimed in claim 14, including a catalytic converter.

20. An engine as claimed in claim 19, including means generating a signal related to the temperature of said catalytic converter.

21. An engine as claimed in claim 17, including a catalytic converter, and wherein said means for controlling the timing of said at least one outlet valve are responsive to a signal related to the temperature of the catalytic converter.

* * * * *